(12) United States Patent
Hoffer, Jr. et al.

(10) Patent No.: US 11,667,380 B2
(45) Date of Patent: Jun. 6, 2023

(54) CABLE ROBOT POSITIONING SYSTEM UTILIZING A LIGHT BEAM MEASUREMENT DEVICE

(71) Applicant: TVS Holdings, LLC, Columbia, MD (US)

(72) Inventors: John M. Hoffer, Jr., Columbia, MD (US); Todd P. Wilson, Parkesburg, PA (US)

(*) Notice: Subject to any disclaimer, the term of this patent is extended or adjusted under 35 U.S.C. 154(b) by 0 days.

(21) Appl. No.: 17/912,537

(22) PCT Filed: May 21, 2021

(86) PCT No.: PCT/US2021/033584
§ 371 (c)(1),
(2) Date: Sep. 19, 2022

(87) PCT Pub. No.: WO2021/237046
PCT Pub. Date: Nov. 25, 2021

(65) Prior Publication Data
US 2023/0139810 A1 May 4, 2023

Related U.S. Application Data

(60) Provisional application No. 63/028,320, filed on May 21, 2020.

(51) Int. Cl.
*B25J 9/16* (2006.01)
*B25J 9/00* (2006.01)
(Continued)

(52) U.S. Cl.
CPC .......... *B25J 9/1697* (2013.01); *B25J 9/0078* (2013.01); *B25J 11/0075* (2013.01);
(Continued)

(58) Field of Classification Search
CPC ....... B66C 13/04; B29C 64/205; B33Y 50/02; B25J 13/08; B25J 9/0078; B25J 9/1697;
(Continued)

(56) References Cited

U.S. PATENT DOCUMENTS 6,826,452 B1   11/2004  Holland et al.
10,471,590 B1 * 11/2019  Vachon ................ B25J 9/1623
(Continued)

FOREIGN PATENT DOCUMENTS

| GB | 2566032 A | 3/2019 |
|---|---|---|
| WO | 2019172253 A1 | 12/2019 |
| WO | 2019241690 A1 | 12/2019 |

*Primary Examiner* — Jason Holloway
(74) *Attorney, Agent, or Firm* — Invention To Patent Services; Alex Hobson

(57) ABSTRACT

A light-based measurement system is capable of directing a light beam to a cooperative target used in conjunction with a cable robot to accurately control the position of the end effector within a large volume working environment defined by a single coordinate system. By measuring the end effector while the device is in operation, the cable robot control system can be adjusted in real time to correct for errors that are introduced through the design of the robot itself providing accuracy in the tens or hundreds of micron range. A coordination processor runs control software that communicates with both the laser tracker and the cable robot. An action plan file is loaded by the software that defines the coordinate system of the working volume, the locations where actions need to be performed by the cable robot, and the actions to be taken.

28 Claims, 15 Drawing Sheets

(51) Int. Cl.
  *B25J 11/00* (2006.01)
  *E01C 19/40* (2006.01)
  *E01C 19/43* (2006.01)
  *E01C 19/00* (2006.01)

(52) U.S. Cl.
  CPC ............ *E01C 19/006* (2013.01); *E01C 19/40* (2013.01); *E01C 19/43* (2013.01)

(58) Field of Classification Search
  CPC ..... B25J 11/0075; E01C 19/006; E01C 19/40; E01C 19/43
  See application file for complete search history.

(56) References Cited

U.S. PATENT DOCUMENTS

| | | |
|---|---|---|
| 11,230,032 B2* | 1/2022 | Post ...................... E04B 1/3505 |
| 2017/0191822 A1 | 7/2017 | Becker et al. |
| 2018/0120196 A1 | 5/2018 | Georgeson et al. |
| 2018/0178397 A1* | 6/2018 | Long ...................... B25J 9/0078 |
| 2018/0281295 A1 | 10/2018 | Tibbits et al. |
| 2019/0017806 A1 | 1/2019 | Becker et al. |
| 2019/0068953 A1 | 2/2019 | Choi et al. |
| 2019/0079522 A1 | 3/2019 | Grau |
| 2019/0224846 A1 | 7/2019 | Pivac |
| 2021/0070438 A1 | 3/2021 | Hoshide |

* cited by examiner

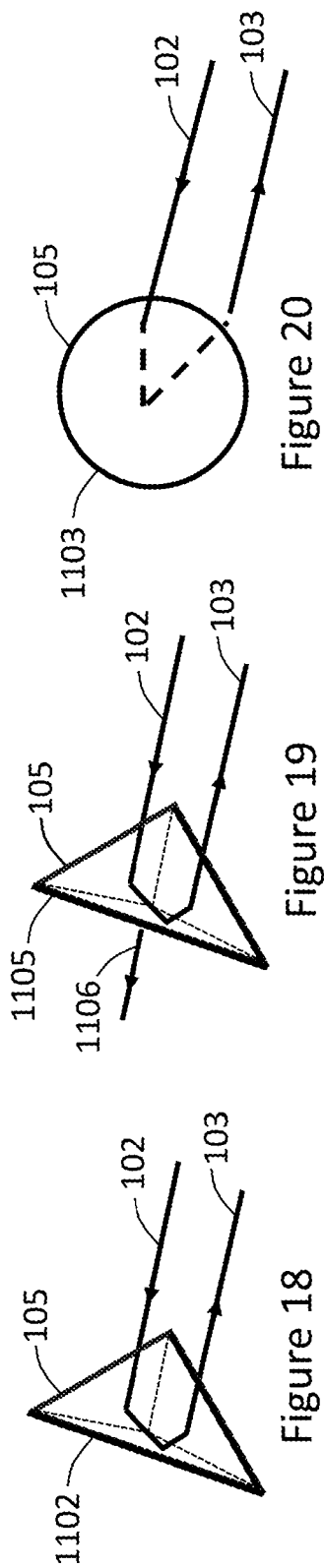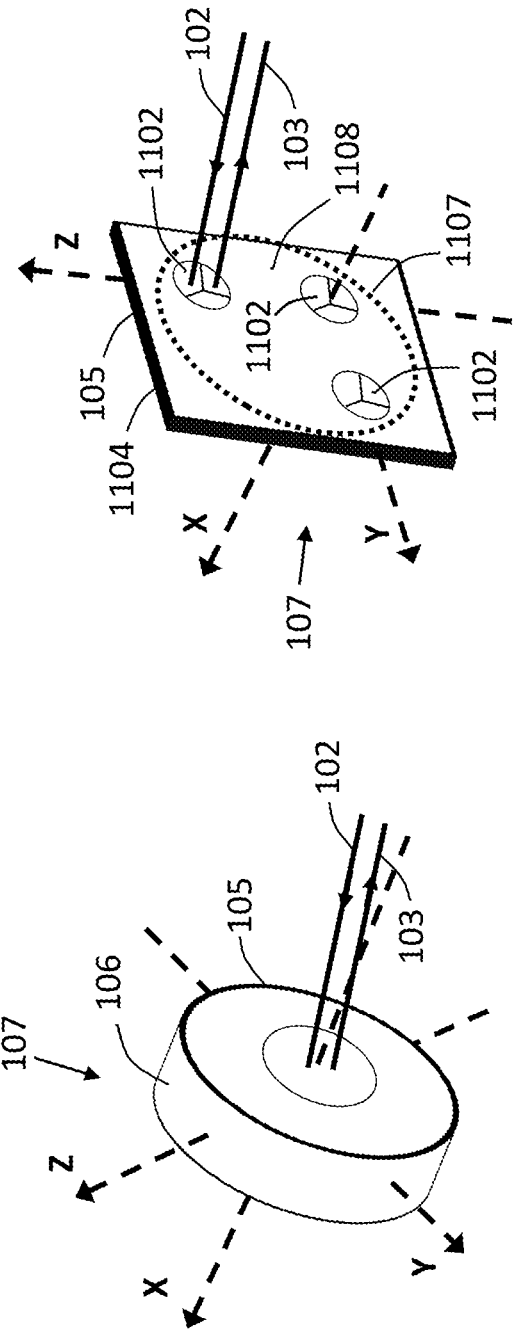

US 11,667,380 B2

CABLE ROBOT POSITIONING SYSTEM UTILIZING A LIGHT BEAM MEASUREMENT DEVICE

CROSS REFERENCE TO RELATED APPLICATIONS

This application is a national stage application of PCT application PCT/US21/33584, filed on May 21, 2021, which claims the benefit of priority to U.S. provisional patent application No. 63/028,320, filed on May 21, 2020, the entirety of which is hereby incorporated by reference herein.

BACKGROUND OF THE INVENTION

Field of the Invention

The invention relates to precise position control of a cable-driven platform within a working volume using a light beam position measurement system utilizing a measurement source and a cooperative target that is capable of measuring in three or more degrees of freedom.

Background

Robots are used to carry out a variety of tasks that were previously performed by humans and the variety of tasks they can perform is constantly growing. A robot as defined herein is any device capable of performing one or more tasks without the need of direct physical human intervention. These tasks require the robot to move in one or more degrees of freedom and an end effector, which is the device or tool connected to the robot capable of performing an action in the environment around the robot. Tasks for a robot include but are not limited to subtractive manufacturing, additive manufacturing, finishing, transportation, recording, and measurement.

Subtractive manufacturing can be defined as the task of removing material from a solid item such as a block or rod to create a desired shape. Exemplary materials are metal, wood, and plastic, and exemplary methods of removing material use end effectors capable of cutting, boring, drilling and grinding. An exemplary subtractive manufacturing robot is a CNC machine.

Additive manufacturing may be defined as the task of adding material to create a shape. A robot capable of moving in multiple degrees of freedom has a nozzle end effector to deposit layers of materials in specific locations that harden to form the desired shape. Exemplary materials for additive manufacturing are metal, plastic, and concrete. This process is often referred to as three-dimensional (3D) printing.

Finishing can be defined as a task of altering the surface of an items to achieve a particular characteristic. An exemplary action would be spray painting, where an end effector nozzle directs paint to a surface. Another exemplary action is cleaning where either an end effector nozzle directs a cleaning solution toward a surface or the end effector is an absorbent material that comes into contact with the surface to remove dirt or debris. Another exemplary action is leveling, where the end-effector is a straight edge that is pulled across a fluid material such as freshly poured concrete to even it. Another exemplary action is smoothing where the end effector is an abrasive material brought into contact with a surface to remove rough spots.

Transportation can be defined as moving an item from one location to another. An exemplary end effector would be a gripper that is capable of grasping an object in a way similar to the human hand, moving it to another location and then releasing its grasp.

Recording can be defined as storing images or sounds for the purposes of viewing or listening to the stored items either in an alternate location or at a future time. An example of this would be a video camera mounted to an automated stage capable of moving around an object being recorded.

Measurement can be defined as using one or more sensors to collect data, such as numeric data, related to a property of an object. Exemplary properties include size, shape, weight, and volume. An exemplary end effector would be a probe tip that physically comes in contact with one or more locations of an object to determine its size and shape. An exemplary robot performing this action would be a coordinate measurement machine. An exemplary end-effector would be a laser scanner, which can be attached to a jointed arm that is capable of moving around an object to determine its size and shape.

For many of these tasks, the working volume is limited by the size of the robot. As the size of the robot is increased, the complexity of the structure required to maintain stability and accuracy increases. This is due to the fact that position measurement in robots rely on individual measurements of each degree of freedom which are then projected to the location of the end effector. If the structure is not stiff enough such that the end effector is capable of moving without being measured by the robot sensors, there is a loss of accuracy in position of the end effector. For applications where the robot must be moved to the locations where tasks are to be performed, this increased structure to create stiffness makes the robot increasingly difficult to transport.

There are examples today of large additive manufacturing robots for printing concrete structures. Scaling these robots up to build larger structures will remain a challenge for transport, setup, and accuracy.

A cable robot, which can also be referred to as a cable-suspended robot or a tendon-driven robot, addresses the scaling up issue by replacing the rigid structure with cables that both support the end effector and control its position by making coordinate changes to all cables but sacrifices positional accuracy and stability. This is adequate for applications where precise movement is not required and positional stability can be addressed directly at the end effector such as with the Skycam which is used at sporting events.

U.S. Pat. No. 4,873,571 Device for Positioning a Mock-Up in Three Dimensions, in Particular for Studying Backscattering from Said Mockup, Balet et al. describes a system for positioning an object in three dimensions using a set of cables and mechanisms to control the length of the cables. In addition, the patent also discloses the use of incremental encoders meant for coarse position of the device and recognizing the limitations of the encoders, places cameras to fine tune the position relying on markers on the object. The invention as disclosed is designed for precise positioning at a single location rather than working at multiple locations in a large working volume. The use of cameras becomes a challenge when the volumes increase and when working in bright ambient light such as sunlight.

U.S. Pat. No. 6,345,724 Crane Apparatus, Masumoto et al., discloses a concept for a crane, which could be considered a specific type of cable robot used for transport. The invention attempts to resolve the issue of sway in the cables. There is no mention of measuring position, but sway would be a problem for any system attempting to control location by relying on stepper motors or encoders.

U.S. Pat. No. 7,753,642 Apparatus and Method Associated with Cable Robot System, Bosscher et al. describes an alternate design for a cable robot. It describes what it defines as a fully-constrained system that determine the end effector position by the lengths of the cables and discloses the difficulty of scaling up these systems. The invention aims to resolve the issues through the cable design, which adds complexity to the robot itself and doesn't address overall accuracy of the system.

Design of a Cable-Driven Parallel Robot with Grasping Device, Martin et al., 28th CIRP Design Conference, May 2018, Nantes, France discloses a particular application where the end effector of a cable robot is a gripper.

U.S. Pat. No. 5,585,707 Tendon Suspended Platform Robot, Thompson et al. is another variant where the cable reels are mounted near the end effector making it the proximal end of the robot with the end of the cables fixed to locations further way at the distal end.

A Laser-Based Direct Cable Length Measurement Sensor for CDPRs, Martin, et al. discloses the concept of measuring the cable length directly using a laser to achieve better accuracy than can reached with typical motors and encoders. However, the solution requires a laser for each cable potentially making the system more complex and expensive. In addition, while it is a more direct measurement than a rotary encoder, there are still errors introduced by cable sagging since it is not a direction measurement of the end effector position.

A key challenge as demonstrated by the prior art is position stability and accuracy over a large volume. Not addressed in the disclosed prior art are other errors such as axis non-squareness, scaling issues, and thermal effects.

Light beam position measurement systems such as laser trackers offer a solution to this problem since they are capable of directing a light beam capable of precisely measuring objects in three or more degrees of freedom over large volumes.

An example of one of these systems for performing 3-D measurements is defined in U.S. Pat. No. 4,790,651 Tracking Laser Interferometer, Brown et al. This device follows a reflective target using an interferometer to provide the distance to the target and angular encoders in combination with a position-sensing device to provide the transverse measurements. In this system, rotation of the target about the axes of the coordinate system is not available. Often, the reflector is mounted in a sphere that has a known radius from the center of the target to the surface of the sphere such that the target measurements can be projected to the location where the surface of the sphere touches the object being measured.

An alternate method of measuring more degrees of freedom is disclosed in U.S. Pat. No. 4,714,339 Three and Five Axis Laser Tracking Systems, Lau et al. Described is a target with a beam splitter and a position-sensing device, which can provide two rotation angles and two linear displacements. The shortcoming of this invention is the field of view for determining the pitch and yaw angles is limited to the field of view of the position sensing device. In addition, there is no measurement of rotation about the axis of the beam.

U.S. Pat. No. 7,701,559 Absolute Distance Meter that Measures a Moving Retroreflector, Bridges, et al. discloses a laser tracker that uses a method of modulating laser intensity to measure the distance to a target while compensating for motion.

U.S. Pat. No. 8,803,055 Volumetric Error Compensation System with Laser Tracker and Active Target, Lau et al. discloses the concept of an active target, which keeps the reflective target pointed back toward the laser tracker while performing compensation on a machine tool. Disclosed is the concept of using the active target to measure machine tool positions to determine positional errors and developing a compensation model, which is not using the data in real-time. Also disclosed is the concept of using the active target in real-time to augment the machine control with a higher accuracy position measurement system. However, this solution requires a robot position system to position the end effector and once motion is complete to augment the motion to further correct the position.

U.S. Pat. No. 8,525,983 Device and Method for Measuring Six Degrees of Freedom, Bridges et al. and U.S. Pat. No. 8,670,114 Device and Method for Measuring Six Degrees of Freedom, Bridges et al. define other methods for measuring six degrees of freedom with a laser tracker.

U.S. Pat. No. 9,976,947 Position Measurement Device, Hoffer discloses a method for performing a multiple degrees of freedom measurements using a combination of moving optics and the polarization property of light. Some of the devices disclosed are light receivers that perform measurements directly without reflecting light back to the measurement source.

Model-Based Control of a Pendulum by a 3-Degree of Freedom (DOF) Cable Robot Using Exact Linearization, Hamann, et al. (2020) discloses the concept of using a laser tracker to determine the position and pose of a pendulum and control it. However, the concept disclosed requires four laser trackers to accomplish the measurement, which would significantly increase the cost of the overall system.

The purpose of these measurement devices is to measure either object or locations, but these devices can also be used as a position feedback in a motion control system.

SUMMARY OF THE INVENTION

The invention is directed to a light-based measurement system capable of directing a light beam to a cooperative target used in conjunction with a cable robot to accurately control the position of the end effector within a large volume working environment defined by a single coordinate system. By measuring the end effector while the device is in operation, the cable robot control system can be adjusted in real time to correct for errors that are introduced through the design of the robot itself providing accuracy in the tens or hundreds of micron range. The large working volume of a cable robot combined with the large measurement volume these measurement devices allow for the creation of a motion control system that works over large volumes and opens several new applications.

An exemplary embodiment of the cable robot system has a laser tracker mounted at a fixed location and a cable robot with an end effector where a cooperative target is configured on the cable robot, such as a single retroflector mounted to or proximal to the end effector mounting structure. A separate coordination computer runs control software that communicates with both the laser tracker and the cable robot. An action plan file may be loaded by the software that defines the coordinate system of the working volume, the locations where actions need to be performed by the cable robot, and the actions to be taken. The control software first establishes a relationship between the device coordinate system of the laser tracker and the working volume by positioning the end effector at three locations in the working coordinate system of the working volume and measuring the position of the cooperative target. The first point is the origin. The second point is on a line that defines the positive x-axis. The third point is off of the x-axis in the direction of the positive y-axis that defines the xy-plane. From these measurements, a transformation matrix can be calculated to convert between locations in the working coordinate system and the laser tracker device coordinate system.

In an exemplary embodiment, the control software may continually measure the cooperative target position on the cable robot while executing the steps defined in the control data file where each step defines a location for the end effector and an action to be performed. For each step location, the control software sets the command position for a control loop that will continuously calculate the necessary outputs to be sent to the cable robot so that it moves to the desired location. Once the cable robot end effector has reached the desired location, the control software may hold the end effector in that position and send a command for the end effector to perform a function. When that function is complete, the control software may then execute the next step from the action plan file until all steps are completed.

In an exemplary embodiment of the cable robot system, the light beam measurement device may not have a beam steering assembly so the measurement beam is in a fixed orientation and has the capability to measure the distance to the cooperative target and horizontal and vertical offsets of the target from the center of the beam. Therefore, while it is a three-dimensional measurement, it has a limited field of view. The light beam measurement device is mounted so that its emitted light beam defines the x-axis of the coordinate system. The coordination software guides the user to place a retro reflector in the beam path such that the target is offset from the beam in the y-axis of the working coordinate system. From these measurements, a transformation matrix can be calculated to convert between locations in the working coordinate system and the measurement device coordinate system, and the control software can begin executing the action plan file.

An exemplary embodiment of the of the cable robot system has a laser tracker mounted to the cable robot in a known or fixed relationship with respect to the end effector and a cooperative target is mounted in a known fixed location within the working coordinate system so that no measurements are required to establish the coordinate system.

An exemplary embodiment of the cable robot system combines the light beam measurement device and the coordination computer in a single unit so that no external computer is required to perform coordination functions.

An exemplary embodiment of a cooperative target is an assembly made of three retroreflectors mounted in a known orientation to each other. The light beam measurement device repeatedly measures each of these retroreflectors in sequence at a rate sufficiently high enough to ensure the cable robot stays within the light beam measurement device's line of site. Measurement of the three individual retroreflectors is combined by the measurement device to produce a single six-degree-of-freedom location measurement. This information allows the coordination computer to both position the cable robot within the working coordinate system and maintain an orientation where the target is always pointing towards the measurement device.

An exemplary embodiment of a cooperative target is a light receiver capable of both reflecting a portion of light back to the light beam measurement device and measuring two rotation angles about the emitted measurement beam. The light beam measurement device can combine its 3D measurement of the target location with the two rotation angles to produce a five-dimensional (5D) measurement the coordination computer can use to both position the cable robot within the working coordinate system and maintain an orientation where the target is always pointing towards the measurement device.

An exemplary embodiment of the cable robot system has a cable robot capable of delivering printable concrete through a nozzle end effector. The action plan file may be a CAD drawing of the structure to be built. The coordination computer commands the cable robot to move along a defined path and open the nozzle by the appropriate amount to distribute the concrete at the necessary rate.

An exemplary embodiment of the cable robot system has a cable robot capable of delivering paint through a spray nozzle end effector. The action plan may be a two-dimensional (2D) drawing of lines to be painted on a parking lot. The coordination computer commands the cable robot to move along a defined path and spray paint at the appropriate locations.

An exemplary end effector includes an actuator, such as a gripper. The cable robot can be commanded to pick up objects such as bricks and transport them to a location with precise placement to build a brick wall.

An exemplary end effector is a non-contact measurement device known as a displacement sensor as an end effector. The coordination computer commands the cable robot to pass over a surface to be measured. The location data of the cable robot combined with the data from the non-contact measurement device can be combined to create a complete measurement of the surface.

An exemplary end effector is a screed tool, where the cable robot can be directed to move the screed tool across poured concrete to smooth it.

An exemplary end effector is a tamper, where the cable robot can be directed to specific locations and then directed to move up and down to compact material such as sand.

An exemplary light beam measurement device is a laser tracker.

An exemplary light beam measurement device is a total station.

An exemplary coordination processor comprises a computer, such as a laptop computer that is able to wirelessly communicate with both the cable robot and the light beam measurement device.

An exemplary cable robot incorporates a motion system capable of moving the position of the end effector in multiple directions independently of the end effector mounting structure. The cooperative target is mounted in a fixed relationship to the end effector. An exemplary end effector position mechanism is capable of high-speed movements allowing the position of the end effector to be adjusted quickly to maintain accurate placement under conditions where environmental conditions such as wind are pushing the end effector assembly. The cable robot can make lower speed corrections to its position allowing the end effector motion system to return to the center of its operating range. An exemplary end effector position mechanism may have rotational and/or translational motion capability and may have an arm or plurality of arms that enable one or more degrees of freedom. As an example, an end effector position mechanism comprises two arms that are pivotally connected to enable extension from the cable robot and the connected arm may be configured on a rotational mount coupled with the cable robot.

An exemplary cable robot system has multiple laser trackers and a single cable robot. The coordination controller maintains the position of the cable robot by determining first which laser tracker has the end effector in its field of view and then commanding that device to track and measure its position.

An exemplary light beam measurement device has an imaging camera capable of identifying cooperative targets over a large field of view and then using the beam steering assembly to direct the emitted measurement beam to the target, which simplifies the target acquisition process for the operator.

Definitions

Action plan as used herein is any digital representation of data that describes locations and actions to be performed by an end effector.

Cable as defined herein is a rope of wire or nonmetallic fiber with significant tensile strength. A cable may have a length of about 5 m or more, about 10 m or more, about 20 m or more, about. 50 m or more and any range between and including the length values provided.

Cable robot as used herein is any autonomous or semi-autonomous device with an end effector supported and position controlled using cables.

Position driver as used herein includes a device that is configured to move the cable robot within three-dimensional space and may comprise one or more cables coupled with the cable robot and with a mechanism to retract and release the cable.

Contact measurement device as used herein is any measurement device that must come in contact with the surface to be measured; and includes, but is not limited to, probe tips and spherically mounted retroreflectors.

Cooperative target as used herein is any target capable of working in conjunction with a measurement device to produce positional measurement of three or more degrees of freedom. Such targets include, but are not limited to, reflective targets and light receivers.

End effector as used herein is any device that is coupled to a robot and capable of interacting with the surrounding environment and includes, but is not limited, camera, microphone, position or measurement probe, implement including paint applicator, wrench, screwdriver, and the like.

Light beam measurement device as used herein is any device capable of projecting a collimated beam of light to determine the position of a target in three-dimensional space.

Laser tracking devices as used herein are a subset of light beam measurement devices that have the ability to steer the measurement beam, which is a laser, in at least two directions enabling it to keep the beam centered on the target and includes, but is not limited to, laser trackers and total stations.

Light receiver as used herein is a cooperative target capable of performing a positional measurement of its location with respect to a light beam without necessarily reflecting a portion of a light beam back to the light source. These types of cooperative targets may also reflect a beam back to the measurement source so that data from both the measurement source and the target can be combined to form a single position measurement.

Non-contact measurement device is any device capable of measuring a distance to a surface or a surface thickness. This includes, but is not limited to, displacement sensors, laser scanners, or other devices using LIDAR.

Paint as used herein is any pigmented liquid or powder that converts to a solid film after application.

Printable materials as uses herein is any material that can be delivered through a nozzle and then hardens. Such materials include but are not limited to molten plastic, liquid resins, powders such as nylon on polyamide, concrete, cementitious grout, mortar, caulk, adhesive, metal powder, or graphite.

Reflective target as used herein is a cooperative target capable of reflecting light back toward a light source so that the target position can be measured. A reflective target includes but is not limited to mirrors, retro reflectors, retro spheres.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 18 is a perspective view of an exemplary retro reflector.

FIG. 19 is a perspective view of an exemplary partially transmissive retro reflector.

FIG. 20 is a perspective view of an exemplary retro sphere.

FIG. 21 is a perspective view of an exemplary light receiving target.

FIG. 22 is a perspective view of an exemplary retro reflector assembly.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
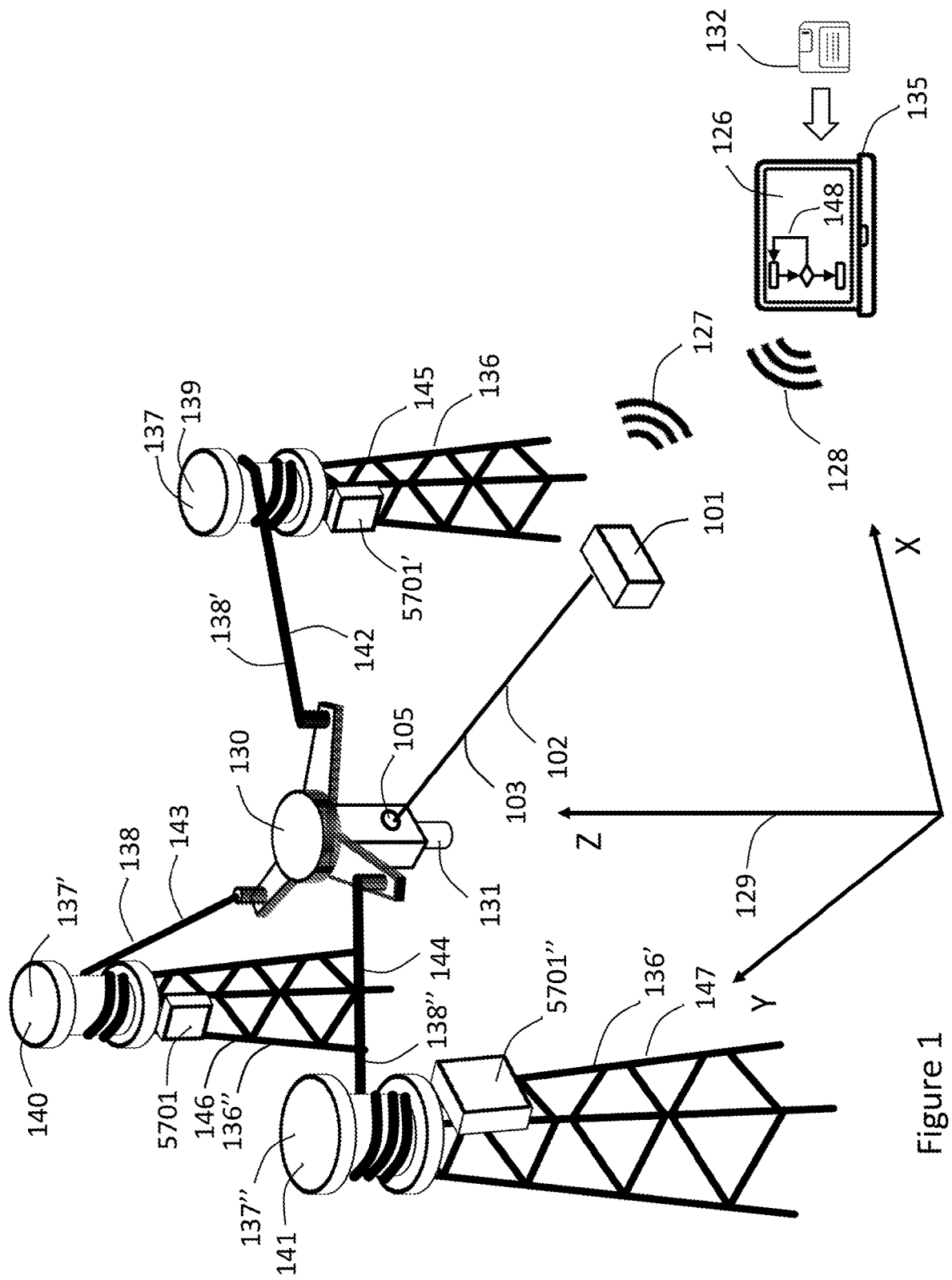
FIG. 1 is a perspective view of an exemplary cable robot system where the coordination processor is a separate device and the reel means is connected to the cable robot mounting structure.

FIG. 1 shows an exemplary cable robot system with an end effector mounting structure 130 that couples an end effector 131, a cooperative target 105, and three cables 138, 138', 138". A cable robot mounting structure 136, 136', 136" comprises a first vertical tower 145, a second vertical tower 146, and a third vertical tower 147 mounted in a fixed relationship to each other that approximately form an equilateral triangle. The reel means 137, 137', 137" are comprised of a first motorized spool 139, a second motorized spool 140, and a third motorized spool 141, respectively. A reel means includes any mechanism to take-up and release a cable, such as a motorized spool. Said first motorized spool is coupled to said first vertical tower and a first cable 142. Said second motorized spool is coupled to said second vertical tower and a second cable 143. Said third motorized spool is coupled to said third vertical tower and a third cable 144. Said reel means is then able to adjust the length of said cables to position said end effector within locations defined by working coordinate system 129. A measurement source 101 transmits an emitted measurement beam 102 for which of portion is reflected back by said cooperative target as a reflected measurement beam 103. Said measurement source produces target data 127 that is transmitted to a coordination processor 126, which is a computer 135, such as a laptop computer, running a control algorithm 148. Said computer processes an action plan 132 and sends an action output 128 to said cable robot command processor 5701, 5701', 5701" to position said end effector in the working volume defined by working coordinate system 129. Beam steering in said measurement source is accomplished by a moveable mirror that can reflect the beam in two angles.

Figure 2:
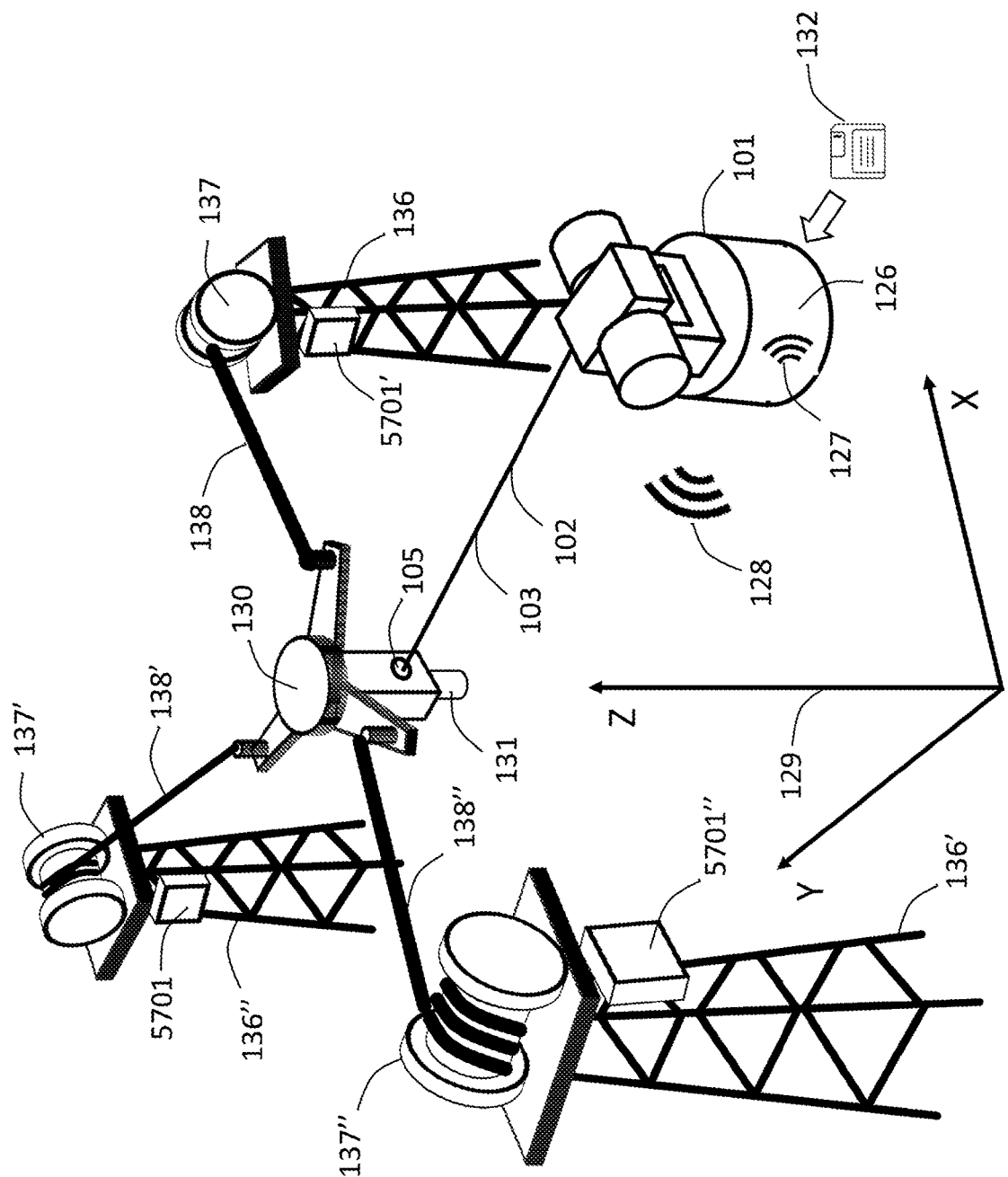
FIG. 2 is a perspective view of an exemplary cable robot system where the coordination processor is integrated with the source measurement device.

FIG. 2 shows an exemplary measurement source 101 that has an integrated coordination processor 126 so that a separate external computer is not required. Beam steering is accomplished by a two-axis gimbal that steers the entire optical assembly.

Figure 3:
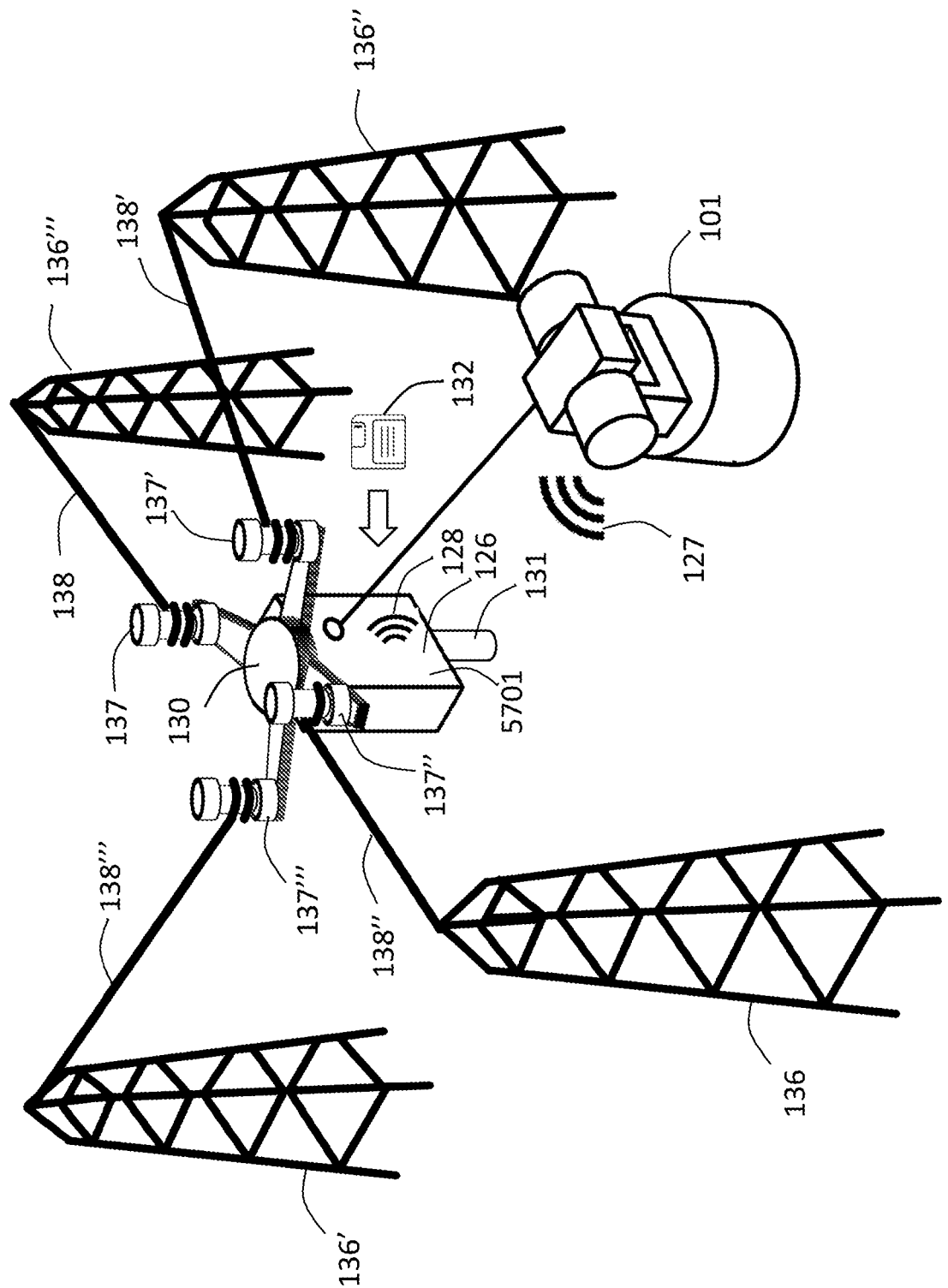
FIG. 3 is a perspective view of an exemplary cable robot system where the coordination processor is integrated with the cable robot and the reel means attached to the end effector platform.

FIG. 3 shows an exemplary cable robot that has an integrated coordination processor 126 and cable robot command processor 5701 so that a separate external computer is not required. Reel means 137, 137', 137", 137"' are coupled to the end effector mounting structure 130 and the cables 138, 138', 138", 138"" are fixed to the cable robot mounting structure 136, 136', 136", 136"', respectively.

Figure 4:
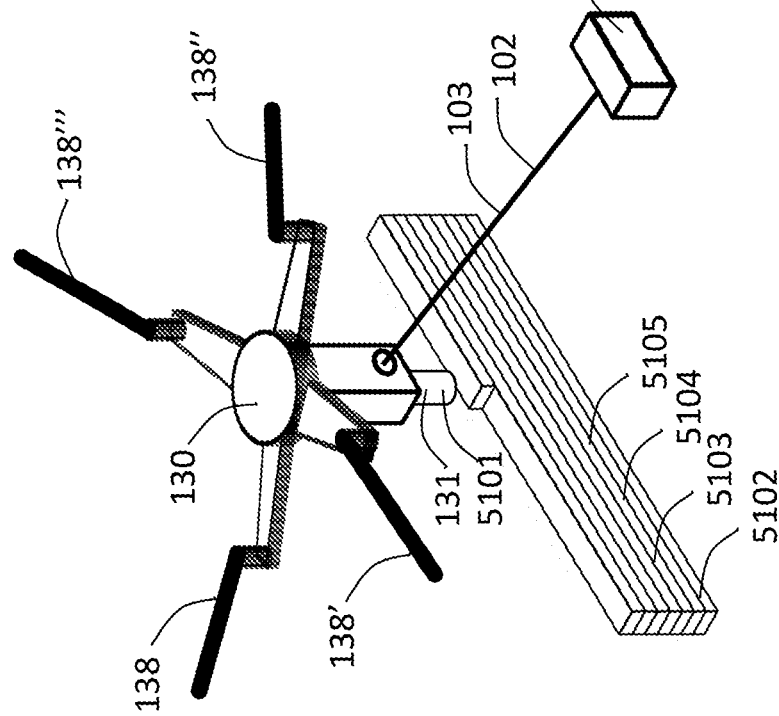
FIG. 4 is a perspective view of is an exemplary nozzle distributing printable material.

FIG. 4 shows an exemplary cable robot with an end effector 131, which is a nozzle 5101 capable of dispensing a printable material 5102 that hardens into a material such as hardened plastic 5103, hardened concrete 5104, or hardened metal 5105.

Figure 5:
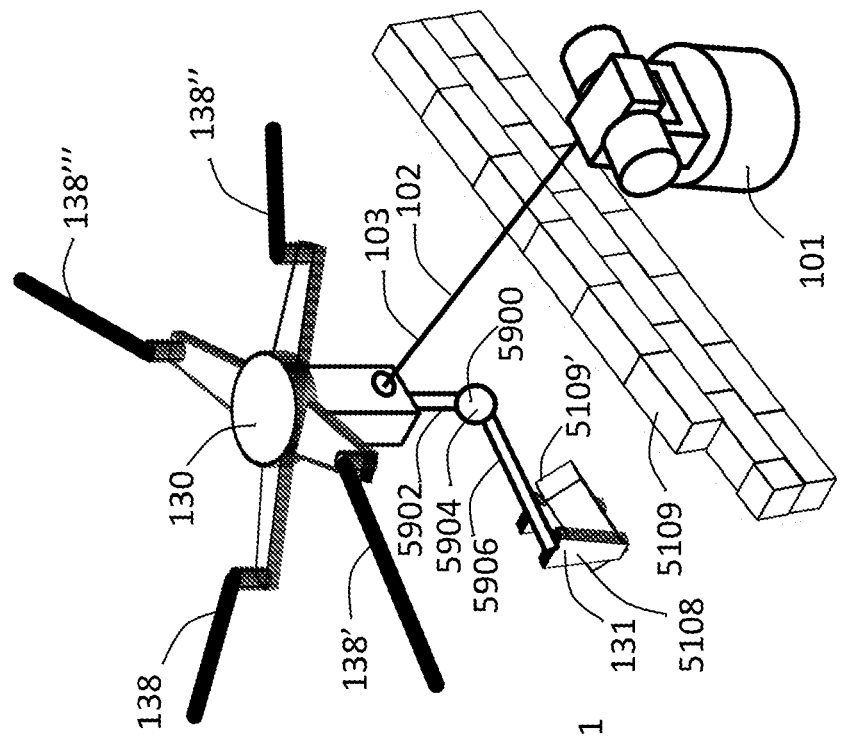
FIG. 5 is a perspective view of an exemplary gripper.

FIG. 5 shows an exemplary gripper 5108 capable of picking up and placing and exemplary object such as a brick 5109. The exemplary gripper 5108 is an actuator type end effector having at least one of the gripper arms that actuates toward the other gripper arm. The gripper 5108 is holding a brick 5109', picked up from the stack of bricks. The exemplary gripper is coupled to an end effector position mechanism 5900 that extends from the end effector mounting structure 130 to the end effector 131, the gripper 5108 actuator. The exemplary end effector position mechanism 5900 has a coupled arm 5902 that is coupled with or attached to the end effector mounting structure 130 and an extended arm 5906 that has the end effector 131 coupled or attached thereto. The extended arm is coupled to the coupled arm by an end effector position mechanism actuator 5904, such as a pivoting and/or rotating joint or coupling between the coupled arm and the extended arm. As shown, the end effector position mechanism actuator 5904 enables pivoting between the coupled arm and the extended arm. The coupled arm may have a rotational engagement or coupling with the aerial robot to provide an additional degree of freedom of rotation. An end effector position mechanism actuator may provide translational motion, rotational motion, and/or pivoting motion between a coupled arm and an extended arm of the end effector position mechanism. Also, any number of end effector position mechanism arms may be configured between a coupled arm and an extended arm to provide additional degrees of freedom.

Figure 6:
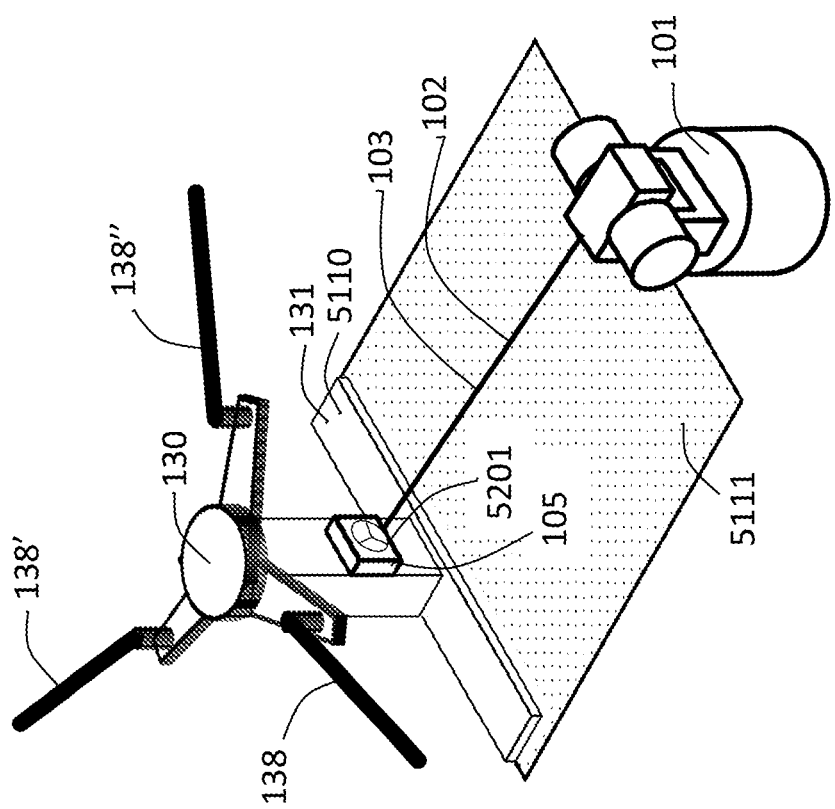
FIG. 6 is a perspective view of an exemplary screed tool used in conjunction with a light receiving target.

FIG. 6 shows an exemplary screed tool 5110 that is pulled across poured concrete 5111 to level the concrete In this application, it is important to control yaw, so the cooperative target 105, is a light receiving target 5201 capable of measuring yaw.

Figure 7:
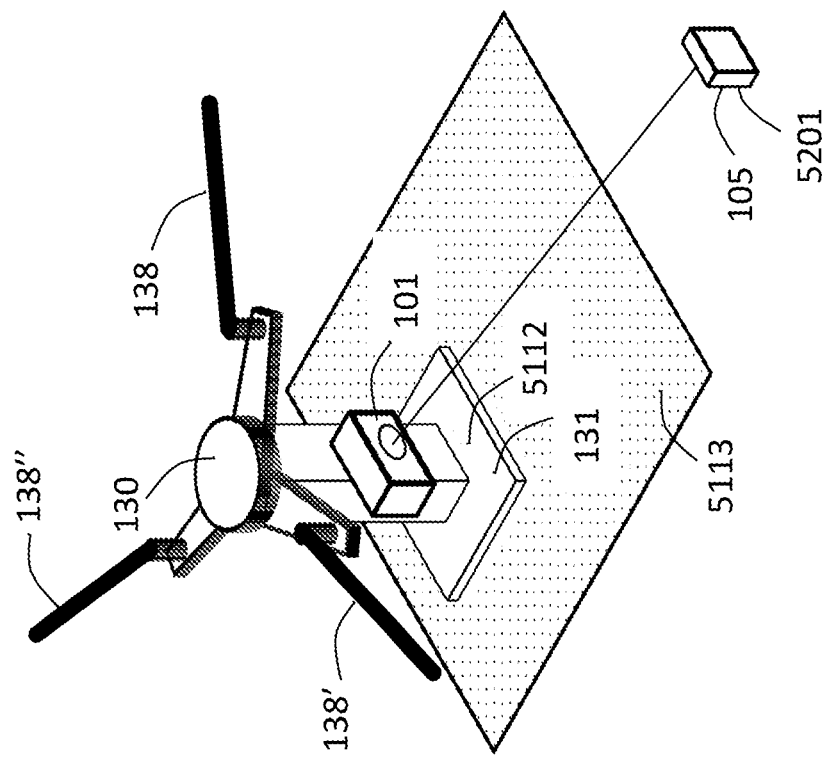
FIG. 7 is a perspective view of an exemplary tamper with the measurement source mounted to cable robot.

FIG. 7 shows an exemplary tamper 5112 used to compact a construction material such as sand 5113. Measurement source 101 is mounted to end effector mounting structure 130 in a known and fixed relationship to the end effector 131 and points to a cooperative target 105 mounted in a fixed location.

Figure 8:
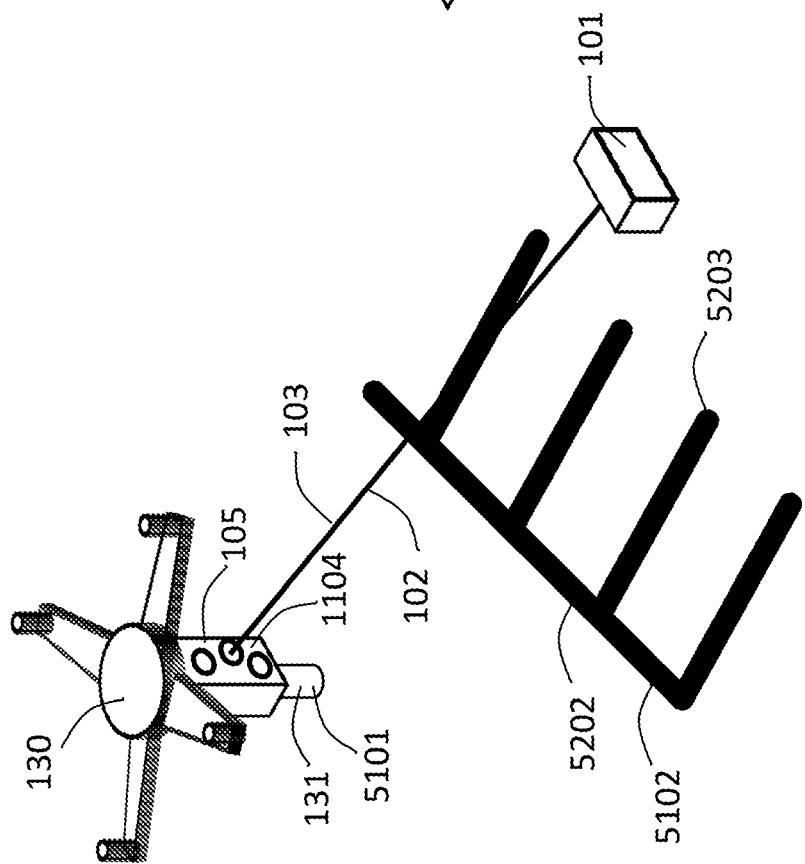
FIG. 8 is a perspective view of an exemplary paint nozzle used in conjunction with a corner cube assembly.

FIG. 8 shows an exemplary cable robot system where a single measurement source 101 with an exemplary retroreflector assembly 1104 wherein said measurement source alternately measures the location of the reflective targets to calculate locations with six degrees of freedom. An exemplary nozzle 5101 delivers a printable material 5102 that is paint 5202 for an application to paint lines for parking spaces 5203. An exemplary camera 5118 captures images.

Figure 9:
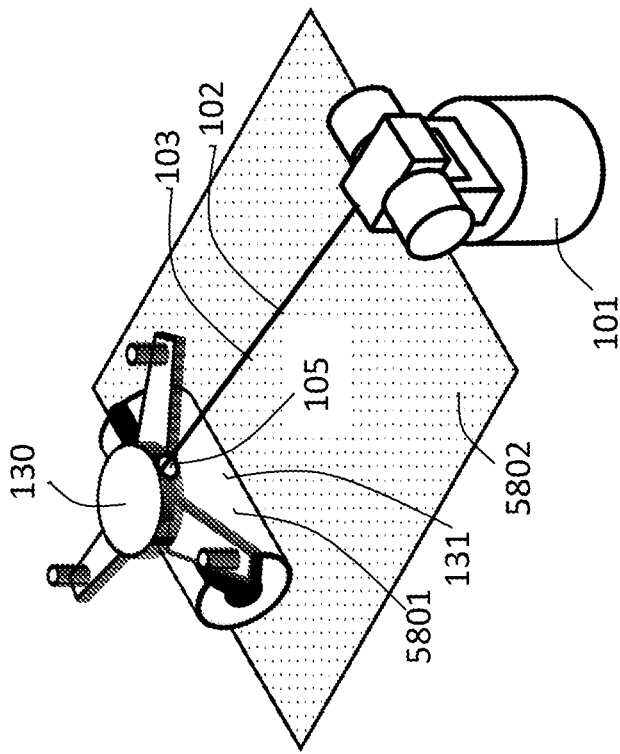
FIG. 9 is a perspective view of an exemplary end effector roller.

FIG. 9 shows an exemplary end effector 131, which is a roller 5801 capable of compacting and smoothing soil 5802.

Figure 10:
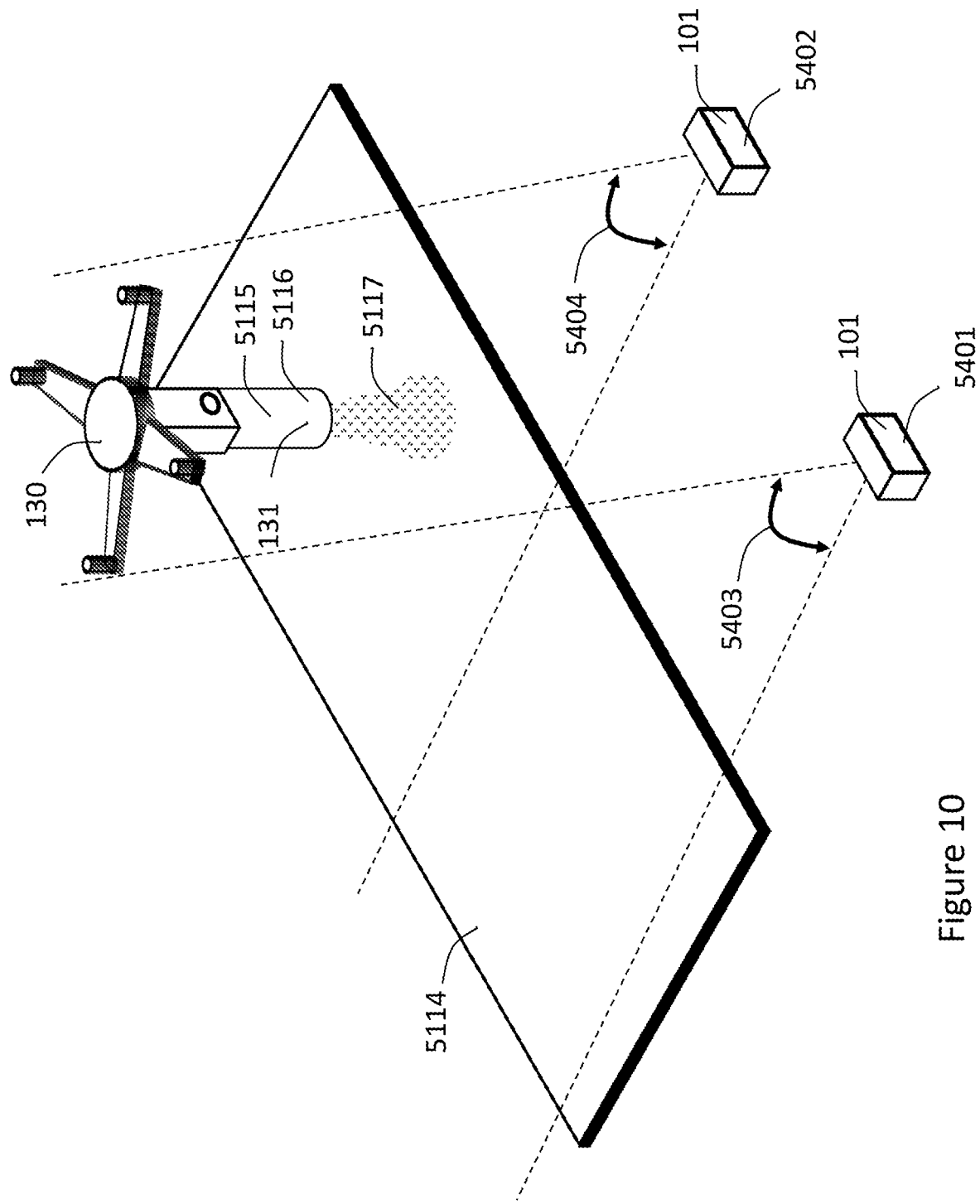
FIG. 10 is a perspective view of an exemplary cable robot system with two measurement sources and a single cable robot with a non-contact measurement probe.

FIG. 10 shows an exemplary cable robot system with multiple measurement sources 101, where a first measurement source 5401 with a first field of view 5403 and a second measurement source 5402 with a second field of view 5404 extends the operating range of a single end effector 131, which is an exemplary non-contact measurement device 5115, which is a displacement sensor 5116, that projects a displacement light beam 5117 onto a surface 5114, which is able to measure the distance to and the thickness of said surface. The exemplary cable robot system only requires a single measurement source to track the cooperative target within a field of view at a time. As the cooperative target moves from a first field of view 5403 to the second field of view the second measurement source 5402 takes over and produces a light beam that is incident on the cooperative target and the first measurement source disengages.

Figure 11:
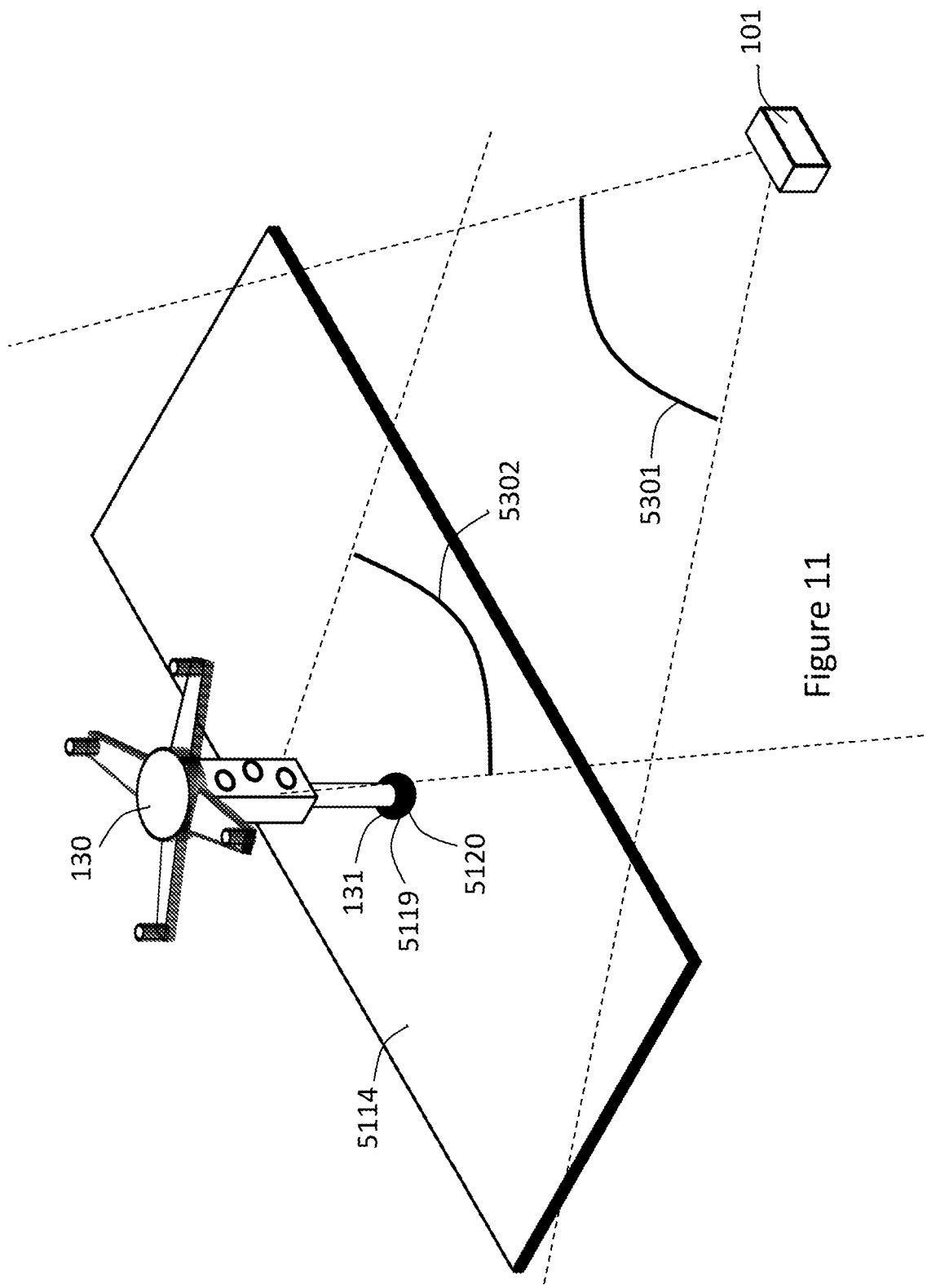
FIG. 11 is a perspective view of is an exemplary measurement source with a target camera showing the camera's field of view used in conjunction with a contact measurement device.

FIG. 11 shows an exemplary measurement source 101 with a target camera and the ability to illuminate targets within the field of view 5301 of said measurement source. Targets must be rotated so that said measurement source is within the light acceptance angle of the targets 5302. Exemplary contact measurement device 5119 end effector 131 is a probe tip 5120.

Figure 12:
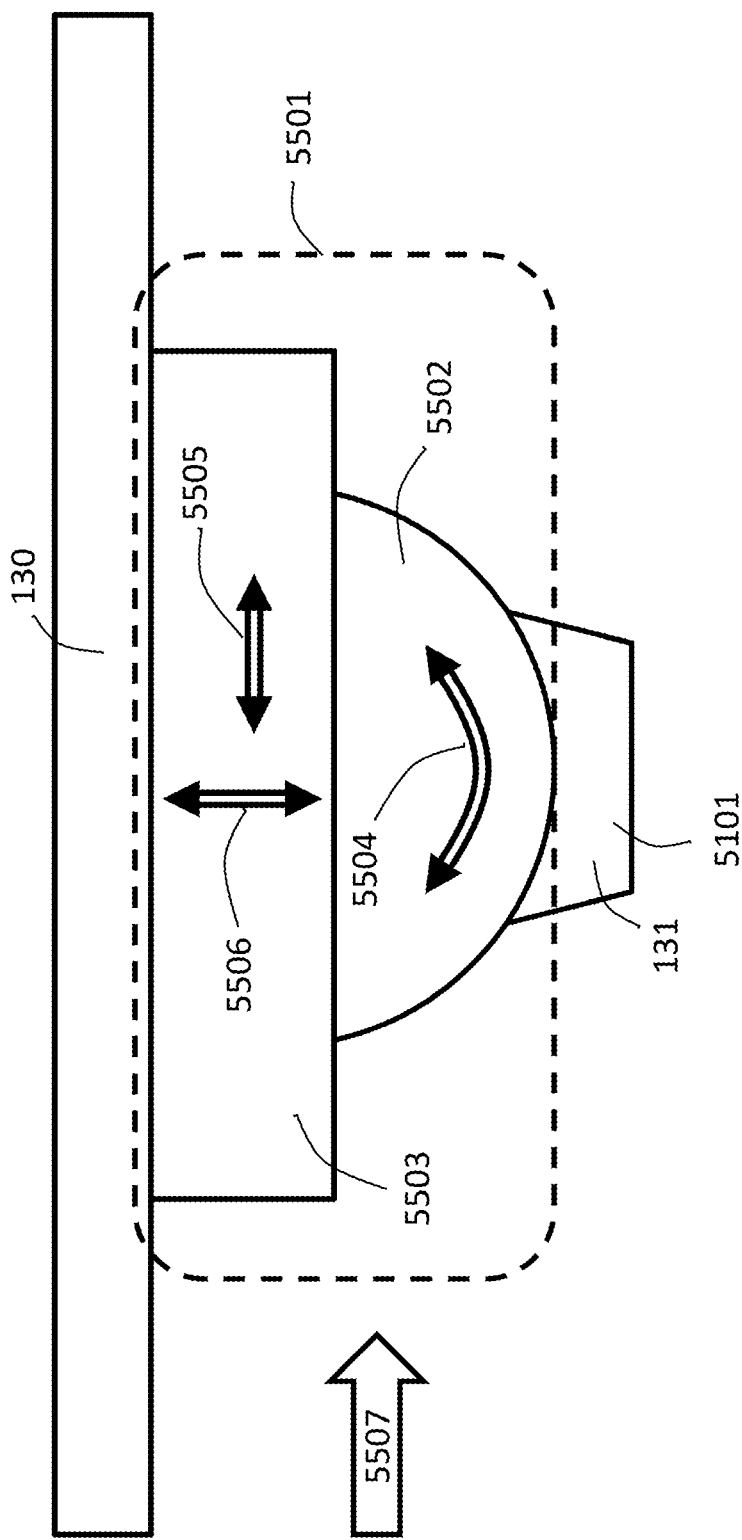
FIG. 12 is a side view of an exemplary end effector position mechanism.

FIG. 12 shows an exemplary end effector position mechanism 5501 coupled to the end effector mounting structure 130. Said end effector position mechanism has a translation structure 5503 capable of horizontal motion 5505 and vertical motion 5506. Said end effector position mechanism also has a rotation structure 5502 capable of rotational motion 5504. A nozzle 5101 connected to this structure would have motion in up to five degrees of freedom with respect to said cable robot mounting structure. The end effector command output 5507 from the cable robot command processor will cause said nozzle to open and close as well as reposition. This configuration allows for faster correction to positional disturbances than are capable through the cable robot reel means.

Figure 13:
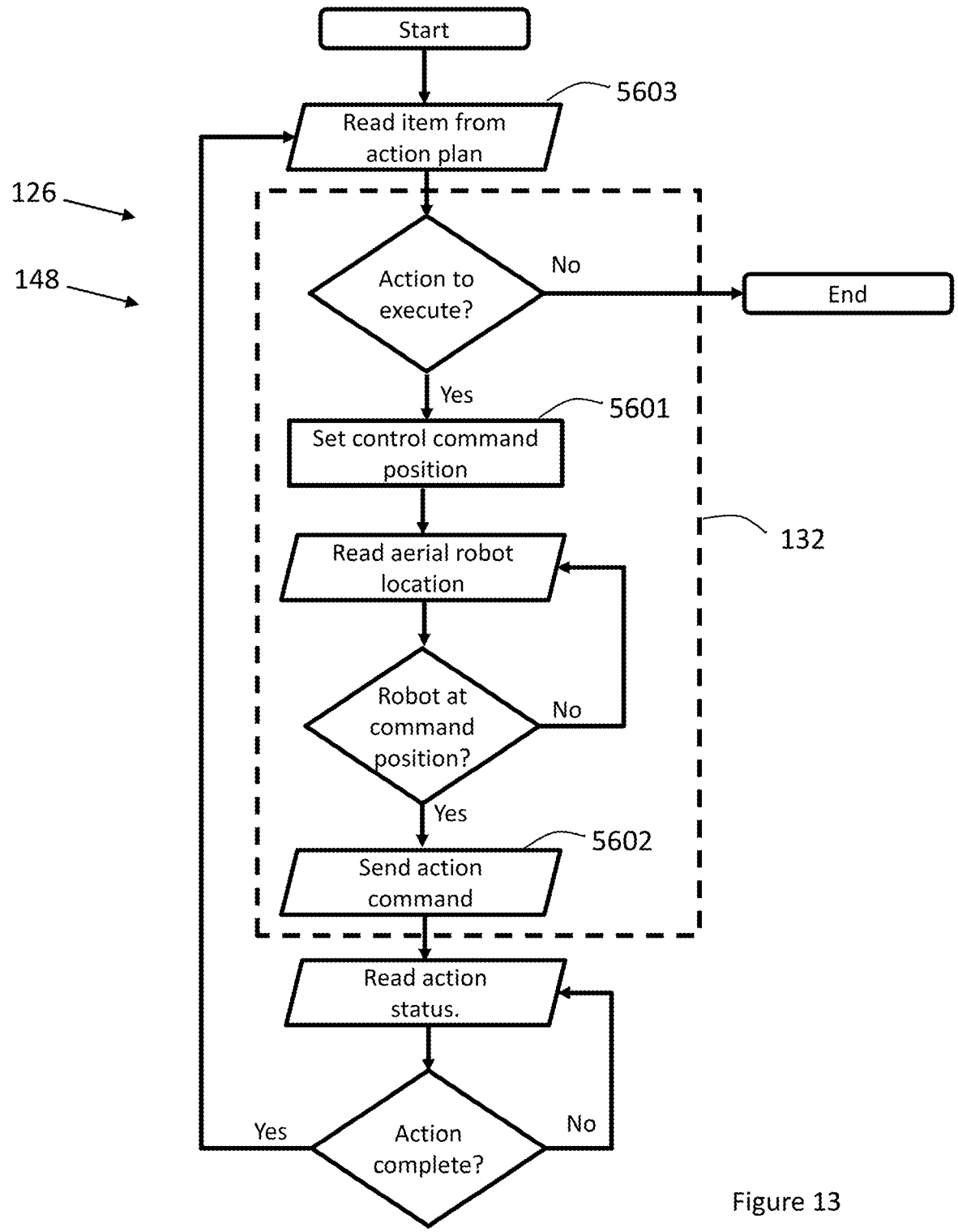
FIG. 13 is a diagram of an exemplary coordination processor with an action plan.

FIG. 13 shows an exemplary coordination processor 126 with a control algorithm 148, and with an action plan 132 read as an input action plan 5603 with one or more operation locations 5601 where the cable robot must be positioned and end effector activator instructions 5602 are executed by the end effector.

Figure 14:
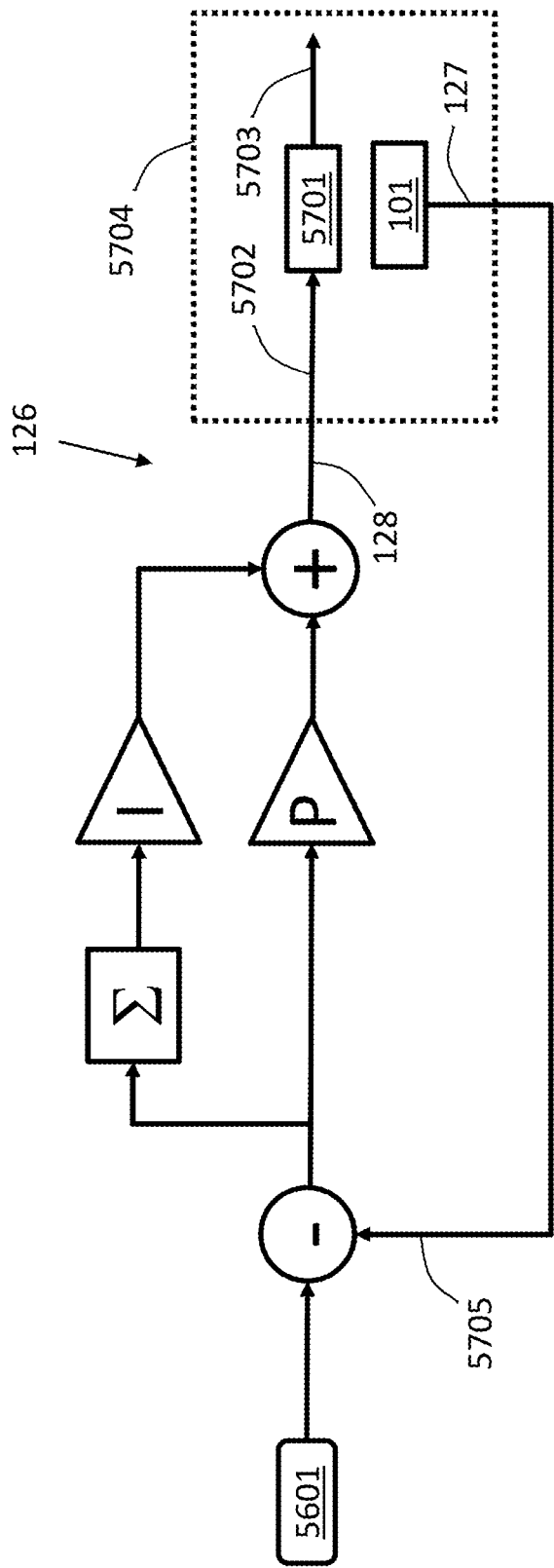
FIG. 14 is a diagram of an exemplary motion control algorithm.

FIG. 14 shows an exemplary motion control algorithm 148 executed by the coordination processor 126 that interacts with the control system plant 5704. Target data 127 from the measurement source 101 is transformed to the working coordinate system and is used as an input measured position 5705, which is compared to one or more operation locations 5601. A PI calculation generates an action output 128, which is instructs the cable robot to adjust its position as a cable robot command input 5702. The cable robot command processor 5701 generates an output reel means command 5703 causing the cable robot to adjust its position.

Figure 15:
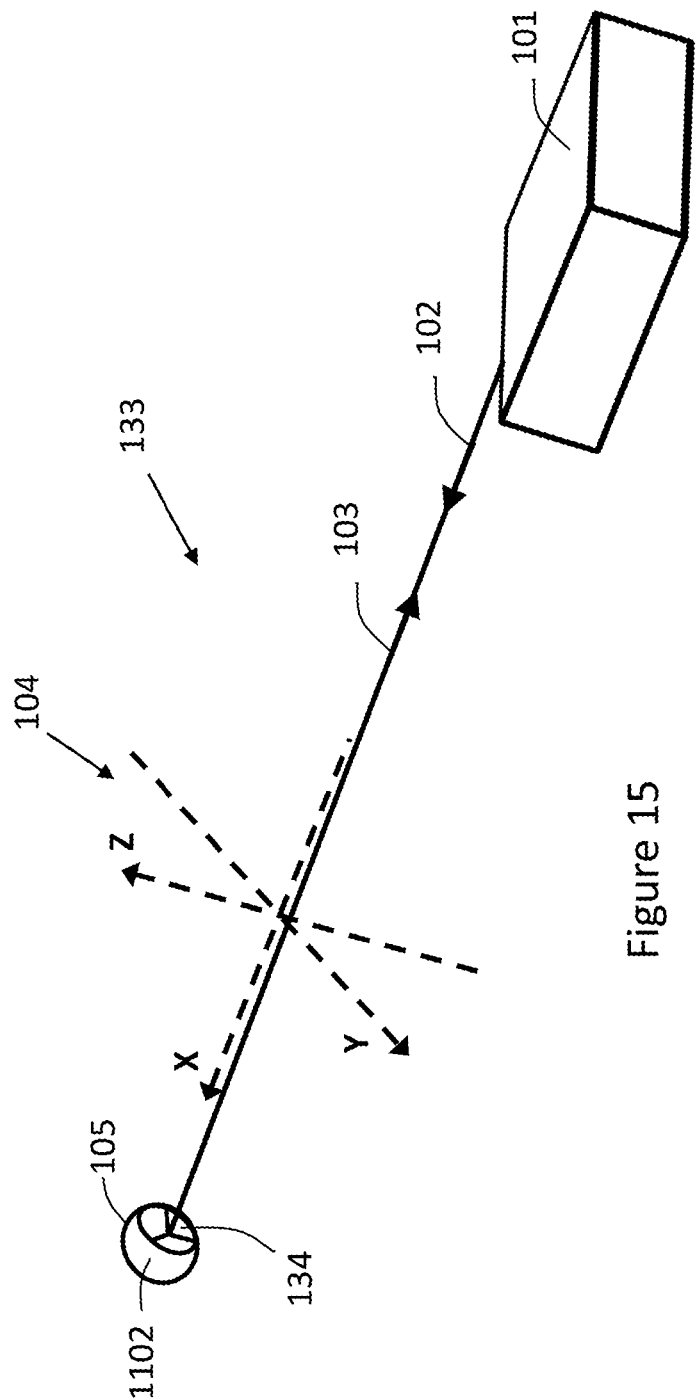
FIG. 15 is a perspective view of an exemplary light beam position measurement system with a single retro reflector.

FIG. 15 shows an exemplary light beam position measurement system 133 with a measurement source 101 that transmits an emitted measurement beam 102 toward a cooperative target 105 that is a single retro reflector 1102 reflecting back a reflected measurement beam 103. Said measurement source is capable of measuring the displacement of said emitted measurement beam from said reflected measurement beam. Said measurement source is capable of redirecting said emitted measurement beam so that it tracks the center of said retro reflector. The tracking angle and measured beam displacement combined with a measured distance to the target produce a target location 134 within the device coordinate system 104 defined by said measurement source, wherein the device coordinate system is a three-dimensional cartesian coordinate system; including three orthogonal axes X, Y, and Z as shown. The target locations in the device coordinate system will typically need to be transformed to locations in a working coordinate system.

Figure 16:
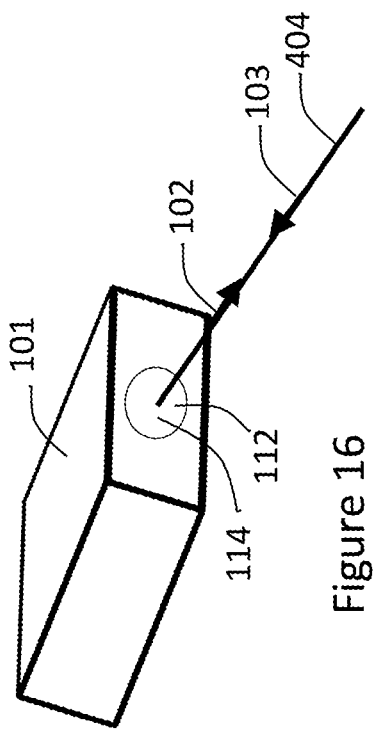
FIG. 16 is a perspective view of an exemplary measurement source.

FIG. 16 shows the front view of exemplary measurement source 101 with a combined measurement source light aperture 112 and source image aperture 114. An exemplary light beam 404 is an emitted measurement beam 102.

Figure 17:
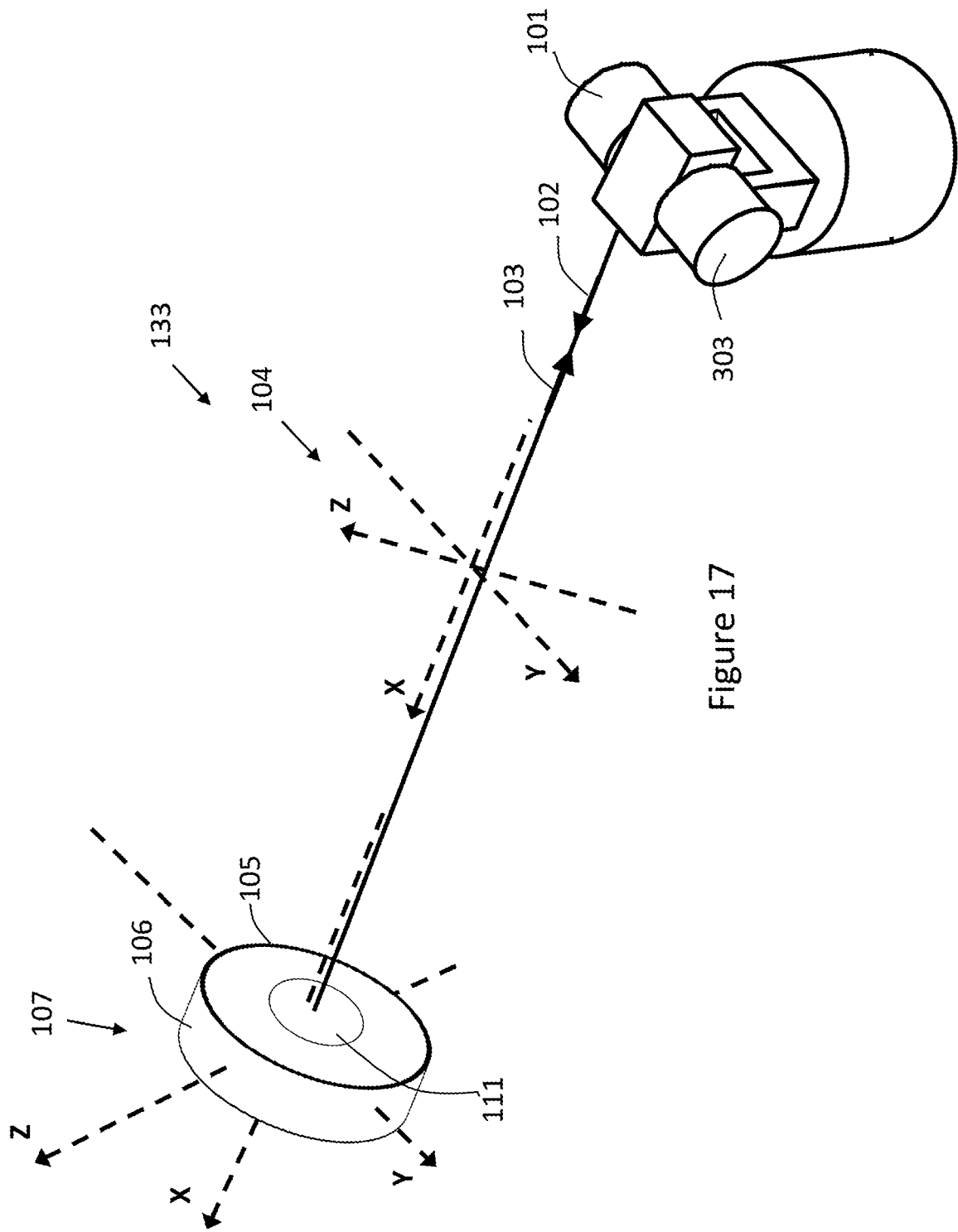
FIG. 17 is a perspective view of an exemplary light beam measurement system with a laser tracker and a light receiving target.

FIG. 17 shows an exemplary light beam position measurement system 133 with a measurement source 101, which is a laser tracker 303 with a beam steering assembly capable of moving the entire assembly to direct emitted measurement beam 102. An exemplary light receiving target 106 has a target light aperture 111 that is capable of reflecting a reflected measurement beam 103 as well as measuring rotations around the axes of a light receiving target coordinate system 107.

FIG. 18 shows an exemplary retro reflector 1102, which is a cooperative target 105.

FIG. 19 shows an exemplary partially transmissive retro reflector 1105, which is a cooperative target 105 capable of reflecting a portion of emitted measurement beam 102 as a reflected measurement beam 103 and transmitting the remaining portion as a transmitted measurement beam 1106.

FIG. 20 shows an exemplary retro sphere, which is a cooperative target 105.

FIG. 21 shows an exemplary light receiving target 106, which is a cooperative target 105 capable of measuring the orientation of the emitted measurement beam 102 within the target coordinate system 107. The orientation can be represented in a set of translations and rotations. Said light receiving target is also capable of reflecting a reflected measurement beam 103.

FIG. 22 shows an exemplary retro reflector assembly 1104, which is a cooperative target 105 with two or more retroreflectors 1107 mounted to a retro reflector mounting structure 1108. The measurement source measures each retroreflector 1102 and calculates a six degree of freedom orientation of the target coordination system 107.

Figure 23:
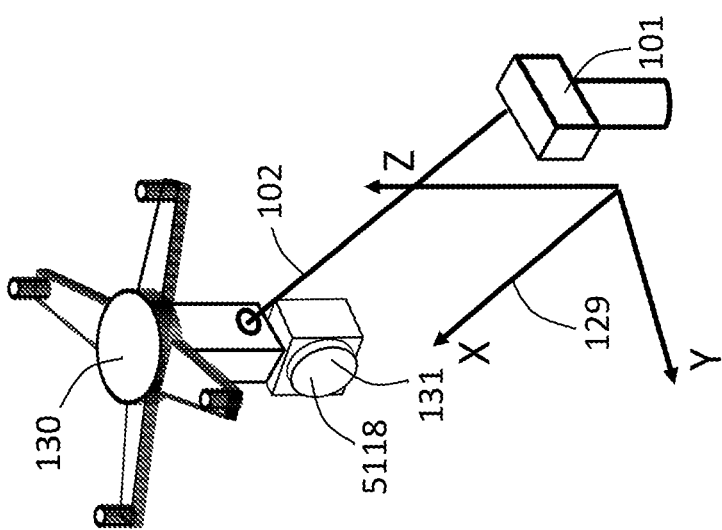
FIG. 23 is a perspective view of an exemplary cable robot system where the light beam measurement device does not have a beam steering capability.

FIG. 23 shows an exemplary cable robot system where the measurement source 101 does not have a beam steering capability and therefor is mounted so that emitted measurement beam 102 is parallel to the X-axis of the working coordinate system 129. The robot and measurement devices will have local coordinate systems, which will require transformations to and from locations that are given with respect to the working coordinate system. It is possible to design a system where the different coordinate systems are aligned and therefore the same. Also shown is an exemplary end effector 131 camera 5118.

Figure 24:
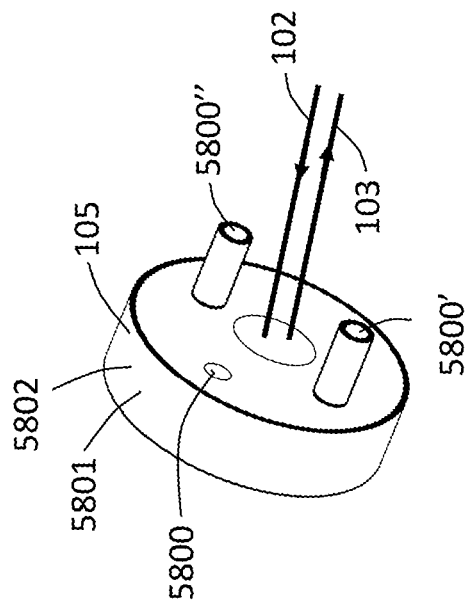
FIG. 24 is a perspective view of an exemplary camera-assisted 6DOF target.

FIG. 24 is an exemplary cooperative target 105, which is a camera-assisted target 5801, which may be also be referred to as a 6 degree of freedom (DOF) target 5802. An emitted measurement beam 102 for which of portion is reflected back by said cooperative target as a reflected measurement beam 103. In addition, there are camera targets 5800, 5800', 5800", that are either reflective or light emitting. A camera combines the image of the camera targets with the position information from the measurement beam to create a six degree of freedom measurement.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

The following references are hereby incorporated by reference herein.

U.S. Pat. No. 4,790,651 Tracking Laser Interferometer, Brown et al.
U.S. Pat. No. 4,714,339 Three and Five Axis Laser Tracking Systems, Lau et al.
U.S. Pat. No. 5,585,707 Tendon Suspended Platform Robot, Thompson et al.
U.S. Pat. No. 6,345,724 Crane Apparatus, Masumoto et al.
U.S. Pat. No. 7,753,642 Apparatus and Method Associated with Cable Robot System, Bosscher et al.
Martin, Antoine; Caro, Stephane; Cardon, Philippe. Design of a Cable-Driven Parallel Robot with Grasping Device. 28th CIRP Design Conference, May 2018, Nantes, France.
U.S. Pat. No. 7,701,559 Absolute Distance Meter that Measures a Moving Retroreflector, Bridges, et al.
U.S. Pat. No. 8,525,983 Device and Method for Measuring Six Degrees of Freedom, Bridges et al.
U.S. Pat. No. 8,670,114 Device and Method for Measuring Six Degrees of Freedom, Bridges et al.
U.S. Pat. No. 8,803,055 Volumetric Error Compensation System with Laser Tracker and Active Target, Lau et al.
U.S. Pat. No. 9,976,947 Position Measurement Device, Hoffer
Hamann, Marcus; Winter, David; Ament Christopher. Model-Based Control of a Pendulum by a 3-DOF Cable Robot Using Exact Linearization. IFAC Papers Online 53-2 (2020) 9053-9060.
Martin, C; Fabritius, M.; Stoll, J. T.; Pott, A. A Laser-Based Direct Cable Length Measurement Sensor for CDPRs. Robotics 2021, 10, 60. https://doi.org/10.3390/robotics 1002060.

What is claimed is:

1. A cable robot position control system comprising:
    a) a light beam position measurement system comprising:
        i) a measurement source that produces an emitted measurement beam that is a light beam; and
        ii) comprising a cooperative target configured within a device coordinate system that has a target location with respect to the measurement source, which is target data;
        wherein a single measurement source tracks the cooperative target within a field of view;
    b) a coordination processor configured to run a control algorithm comprising:
        i) an input measured position;
        ii) an output motor command; and
        iii) end effector activator instructions;
    c) a cable robot comprising:
        i) a two or more position drivers;
        ii) an end effector; and
        iii) a cable robot mounting structure;
    wherein the cooperative target is coupled with the cable robot in a fixed positional relationship to said end effector;
    wherein the measurement source is in a fixed location that is independent of movement of the end effector;
    wherein the cable robot mounting structure, the two or more position drivers, and the end effector is configured so that the two or more position drivers can take-up and release their cables to position the end effector with respect to the position of said measurement source;
    wherein said emitted measurement beam is incident on said cooperative target such that said light beam position measurement system produces said target location within a device coordinate system, which is said target data representing the position of the end effector;
    wherein said target data is provided as an input measured position to said control algorithm to generate said robot positional instructions and said end effector activator instructions;
    wherein said cable robot receives said output motor command and operates the position driver to set the position of the end effector;
    wherein said cable robot receives said end effector activator instructions and operates said end effector.

2. The cable robot system of claim 1, wherein said end effector is a nozzle configured to deliver a printable material.

3. The cable robot system of claim 2, wherein said printable material is paint.

4. The cable robot system of claim 2, wherein said printable material comprises concrete.

5. The cable robot system of claim 1, wherein said end effector is a gripper actuator.

6. The cable robot system of claim 1, wherein said end effector is a non-contact measurement device.

7. The cable robot system of claim 1, wherein said end effector is a contact measurement device.

8. The cable robot system of claim 1, wherein said end effector is a camera.

9. The cable robot system of claim 1, further comprising an end effector position mechanism configured between the cable robot and the end effector and configured to move the end effector independently of said cable robot.

10. The cable robot system of claim 1, wherein the position driver comprises a reel means.

11. The cable robot system of claim 1, wherein said cooperative target is a retro reflector assembly comprising:
    a) two or more retro reflectors; and
    b) a retroreflector mounting structure;
    wherein said two or more retroreflectors are coupled to said retroreflector mounting structure such that their relationship to each other is known;
    where said measurement source measures said two or more retroreflectors such that said target data represents four or more degrees of freedom.

12. The cable robot system of claim 1, wherein said cooperative target is a light receiving target capable of measuring one or more degrees of freedom such that said target data represents four or more degrees of freedom.

13. The cable robot system of claim 1, wherein said cooperative target is a 6 degree of freedom target.

14. The cable robot system of claim 1, wherein said measurement source is a laser tracker.

15. A cable robot position control system comprising:
    a) a light beam position measurement system comprising:
        i) a measurement source that produces an emitted measurement beam that is a light beam; and
        ii) comprising a cooperative target configured within a device coordinate system that has a target location with respect to the measurement source, which is target data;
        wherein a single measurement source tracks the cooperative target within a field of view;
        wherein the target data comprises two or more degrees of freedom;

b) a coordination processor configured to run a control algorithm comprising:
   i) an input measured position;
   ii) an output motor command; and
   iii) end effector activator instructions;
c) a cable robot comprising:
   i) two or more position drivers;
   ii) an end effector; and
   iii) a cable robot mounting structure;
wherein the measurement source is coupled with the cable robot in a fixed positional relationship to the end effector;
wherein the cooperative target is in a fixed location that is independent of movement of the end effector;
wherein the cable robot mounting structure, the two or more position drivers, and the end effector are configured so that the two or more position drivers can take-up and release their cables to position the end effector with respect to the position of said cooperative target;
wherein said emitted measurement beam is incident on said cooperative target such that said light beam position measurement system produces said target location within a device coordinate system, which is said target data representing the position of the end effector;
wherein said target data is provided as an input measured position to said control algorithm to generate said robot positional instructions and said end effector activator instructions;
wherein said cable robot receives said output motor command and operates the position driver to set the position of the end effector;
wherein said cable robot receives said end effector activator instructions and operates said end effector.

16. The cable robot system of claim 15, wherein said end effector is a nozzle configured to deliver a printable material.

17. The cable robot system of claim 16, wherein said printable material is paint.

18. The cable robot system of claim 16, wherein said printable material comprises concrete.

19. The cable robot system of claim 15, wherein said end effector is a gripper actuator.

20. The cable robot system of claim 15, wherein said end effector is a non-contact measurement device.

21. The cable robot system of claim 15, wherein said end effector is a contact measurement device.

22. The cable robot system of claim 15, wherein said end effector is a camera.

23. The cable robot system of claim 15, further comprising an end effector position mechanism configured between the cable robot and the end effector and configured to move the end effector independently of said cable robot.

24. The cable robot system of claim 15, wherein the position driver comprises a reel means.

25. The cable robot system of claim 15, wherein said cooperative target is a retro reflector assembly comprising:
    d) two or more retro reflectors; and
    e) a retroreflector mounting structure;
    wherein said two or more retroreflectors are coupled to said retroreflector mounting structure such that their relationship to each other is known;
    where said measurement source measures said two or more retroreflectors such that said target data represents four or more degrees of freedom.

26. The cable robot system of claim 15, wherein said cooperative target is a light receiving target capable of measuring one or more degrees of freedom such that said target data represents four or more degrees of freedom.

27. The cable robot system of claim 15, wherein said cooperative target is a 6 degree of freedom target.

28. The cable robot system of claim 15, wherein said measurement source is a laser tracker.

* * * * *